United States Patent [19]

Ha et al.

[11] 3,806,254

[45] Apr. 23, 1974

[54] AGC SERVO SYSTEM HAVING ERROR SIGNAL RESPONSIVE TO A NON-EXTINGUISHABLE INTENSITY LIGHT ENERGY SIGNAL

[75] Inventors: In W. Ha; Frank D. Ruble, both of San Jose, Calif.

[73] Assignee: Information Storage Systems, Inc., Cupertino, Calif.

[22] Filed: Dec. 8, 1971

[21] Appl. No.: 205,804

[52] U.S. Cl. ............ 356/169, 250/237 G, 350/162, 340/174.1

[51] Int. Cl. ........................ G01b 11/02, G02b 5/18

[58] Field of Search ... 356/169; 250/217 R, 217 SS, 250/237 R, 237 G; 83/371

[56] References Cited

UNITED STATES PATENTS

| | | | |
|---|---|---|---|
| 3,487,399 | 12/1969 | Wogatzke | 250/237 R |
| 3,597,750 | 8/1971 | Brunner et al. | 340/174.1 |
| 3,494,236 | 2/1970 | Kono et al. | 83/371 |
| 3,244,895 | 4/1966 | Anderegg | 250/237 R |
| 3,424,911 | 1/1969 | Cockrell | 83/74 |
| 3,329,822 | 7/1967 | Rogers | 250/237 R |

FOREIGN PATENTS OR APPLICATIONS

| | | | |
|---|---|---|---|
| 829,024 | 2/1960 | Great Britain | 250/237 G |

*Primary Examiner*—Ronald L. Wibert
*Assistant Examiner*—Steven K. Morrison
*Attorney, Agent, or Firm*—Moore, Zimmerman & Dubb

[57] ABSTRACT

An automatic gain control arrangement is provided for accurately sensing the movement of read/write heads of a memory disc pack drive mechanism. A stationary table or reference has two gratings and a control grid which are positioned in the light paths extending from a plurality of light sources having corresponding sensors likewise positioned with respect to a movable grating whose movement follows that of read/write heads. Grid and grating structures provided upon the stationary table, and the movable grating are provided with transparent and non-transparent lines, phase displaced so as to ensure that a detectable quantity of light passes to the sensors even when the grid lines are at their points of maximum misalignment. By receiving at all times a quantum of light at the sensors, a sensor output is constantly available for generation of a servo error signal.

1 Claim, 4 Drawing Figures

INVENTOR.
In W. Ha
BY Frank D. Ruble
C. Michael Zimmerman
ATTORNEY

AGC SERVO SYSTEM HAVING ERROR SIGNAL RESPONSIVE TO A NON-EXTINGUISHABLE INTENSITY LIGHT ENERGY SIGNAL

CROSS REFERENCE TO RELATED APPLICATIONS

This invention relates generally to the inventions disclosed and claimed in commonly-owned and copending U.S. Pat. applications, Ser. No. 63,508 filed Aug. 13, 1970, in the name of T. W. Martin et al. for "Position Sensor" and now abandoned, and Ser. No. 172,781 filed Aug. 18, 1971 in the names of Frank J. Sordello et al. for "Linear Positioning Apparatus for Memory Disc Pack Drive Mechanisms".

BACKGROUND OF THE INVENTION

The present invention relates to apparatus for sensing the movement of one member, such as a read/write head of a data memory device of the disc drive type, with respect to another member, such as a data storage surface of such a memory device. More particularly, the present invention relates to transducer means for sensing such movement and controlling the positioning of the one member with respect to the other based on such sensing.

As the speed of computers and other data processing units has increased, there has been a strong demand that the speed with which data or information is transferable between data memories and processing units be correspondingly increased. There has also been a great demand that the data capacity of memory devices be made as large as practical. For these reasons, direct access memories of this type employing a pack of rotating magnetic discs for recording and storing data are being widely adopted. Memories of this nature have the advantage of enabling information to be either transferred to, or removed from, randomly selected locations or tracks on a disc surface without the necessity of the memory having to serially "seek" the desired location such as must be done with, for example, magnetic tape memories. To this end, random access disc pack memories rely on movement of read/write heads radially of a disc pack between different radial locations thereon, each one of which corresponds with a generally circular track on the disc at which information can be stored.

The actuation means of such a drive mechanism for moving and positioning the read/write heads with respect to their corresponding recording surfaces must be quite fast-acting in order to achieve the desired high speed. Moreover, it must be capable of accurately positioning and holding the heads at discrete positions which are spaced quite close to one another to provide the track density necessary for high data capacity. Thus, sophisticated position sensing and controlling systems, such as those disclosed in the two previously mentioned copending applications, have been developed. These systems include transducers which determine the position of the read/write heads with respect to the recording surfaces at any given time, and generate suitable servo control signals for moving the read/write heads to a desired location. The preferred arrangements disclosed in the copending applications include optical transducers which rely on the movement of a pair of gratings with respect to one another to vary the amount of light receivable by photoelectric sensors from appropriate light sources. One of the gratings is mounted on the carriage of the read/write heads for movement therewith, and the other is maintained in a stationary location as are the recording discs so that their relative movement, and, hence, the variation in light received by the photoelectric sensors, is indicative of the movement and positioning of the heads with respect to the recording surfaces.

It will be appreciated that for an optical transducer of this type to be accurate, any variation in light received by the sensors must be due to the relative positioning of the gratings, rather than any variation in the intensity of the light emitted by the light source. However, the intensity of those light sources now available which are appropriate for use in this type of optical transducer varies from unit to unit as well as over the temperature range to which each is subjected and over its expected operating life. For this reason, automatic gain control circuitry has been provided in the past for comparing the intensity of the light emitted by a source, as reported by a photoelectric sensor, with a reference potential and then adjusting the output as is necessary to maintain the desired constant output.

U.S. Pat. No. 3,597,750 which is assigned to the same assignee as this application describes such an automatic gain control arrangement for the pair of light sources of the optical transducers described in the previously mentioned copending applications which provide the so-called position signals. The gain control is obtained by comparing the output of the two sensors associated with the sources in a particular manner resulting in error signals for the drivers of the respective sources. Such error signals correct the output of the drivers when necessary to maintain the light output constant.

Each of the arrangements described in the copending applications includes a third optical transducer for producing a signal indicative of the arrival of the heads within a selected vicinity of a desired track location. Such signal, commonly called a "track vicinity" signal, has a triangularly shaped waveform and is 90° out of phase with respect to the other two signals. Because of this phase relationship, the comparison method described in the patent is not suitable for maintaining the intensity of the light source constant. Moreover, the varying nature of the output renders other more conventional automatic gain control arrangements unusable.

The peaks of the track vicinity signal coincide in time with the arrival of the heads at track locations. This means that when the heads remain at a particular location for a period of time for the transfer of data, the track vicinity signal will remain at its peak value corresponding to the location. Keeping the intensity of the track vicinity light source constant is very critical for the proper dynamic performance of the machine. In the positioning system described in copending application Ser. No. 172,781, it is both the higher potential and lower potential peaks of the vicinity signal that are used to indicate track locations. Thus, in such system there is no single intensity level of the light which can be maintained constant to assure that potential light variation error at both peaks is corrected. Moreover, the lower peak is caused by a minimum of light transmission through the gratings. In the past, this minimum has been obtained by so positioning indicia on the two gratings relative to one another that passage of any light to the sensor is prevented. It will be appreciated that when light is not being received by the sensor, there is no sensor output to vary in response to light intensity variations, and thus no information available from the sensor to detect such light intensity variations.

SUMMARY OF THE INVENTION

The present invention provides an automatic gain control arrangement for a transducer for sensing the movement of one member with respect to another, which arrangement assures that a constant gain is maintained for the transducer even though its output is a varying signal and one state of the signal that must be assured of being constant is a point of minimum potential of the varying signal. This is accomplished in the instant invention by comparing the varying output of the transducer with a reference signal to maintain at least one selected state of the transducer at a constant level and by biasing the transducer means so that such state is always at a value other than zero. When the transducer is an optical transducer having gratings or other elements which vary the light received by a sensor, the biasing is simply obtained by providing areas of transparency or translucency in the gratings to allow light to pass therethrough to the sensor even when the gratings are so positioned relative to one another to allow a minimum of light passage.

Most desirably, the invention also provides automatic gain control for the transducer at two selected states thereof. To this end, the invention includes a pair of reference signals, one for comparison with the potential level of the output representative of one of the states and the other for comparison with the potential level of the output representative of the other state, and a switching arrangement for providing the appropriate comparison, depending upon which state must be maintained constant at the particular mode of operation of the apparatus.

BRIEF DESCRIPTION OF THE DRAWING

With reference to the accompanying single sheet of drawing.

DETAILED DESCRIPTION OF THE PREFERRED EMBODIMENT

Figures 1, 2, 3, 4:
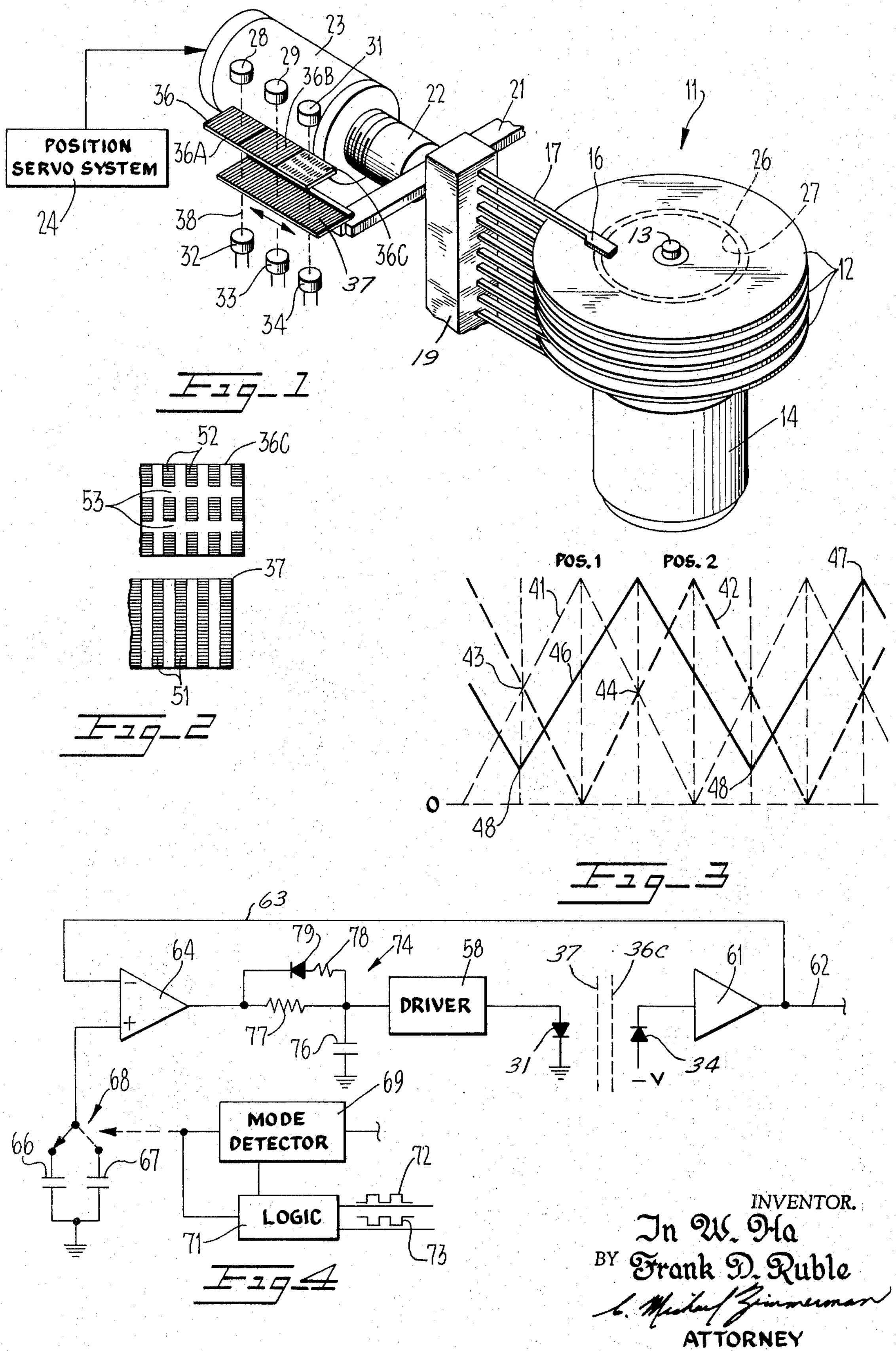
FIG. 1 is an isometric schematic view illustrating the major components of a disc drive and recording mechanism, including an optical position sensing arrangement of the type to which the invention is particularly applicable.
FIG. 2 is a schematic plan view of portions of a pair of gratings of a preferred embodiment of a position sensing arrangement of the invention.
FIG. 3 is a composite view of the track vicinity output signal obtainable with the instant invention superimposed on typical position signals.
FIG. 4 is a block diagram of a preferred automatic gain control arrangement of the instant invention combined with the optical position sensing arrangement of FIG. 1.

FIG. 1 illustrates the major components of a data storage and recording apparatus of the type to which the present invention is particularly applicable. Such apparatus includes a data storage device 11 of the so-called disc pack type, made up of a plurality of coaxial recording discs 12 mounted for rotation together on a drive spindle 13. The active planer surfaces of each disc 12 are coated with a magnetically recordable material to enable the desired data storage. A motor 14 is provided for axially rotating the disc pack so that data can be selectively transferred onto or from circular tracks on the individual disc surfaces by corresponding data transfer devices in the form of read/write heads 16. A head 16 is provided for each active disc surface and such heads are individually supported by associated cantilevered support arms 17 extending radially of the discs from an upright 19 of a translatable carriage 21.

Carriage 21 is secured to the moving coil 22 of an electromagnetic actuator 23. The actuator is energized by a position servo system, represented diagramatically in FIG. 1 by block 24 to translate carriage 21 and, hence, the read/write heads 16 radially of the disc pack 12 and hold the same at various radial locations with respect to the disc surfaces. Each radial location, i.e., relative position of the heads with respect to the disc surfaces, corresponds to a closed path or track of each head over its associated disc surface formed upon rotation of the pack. Data is transferable to and from each head and its corresponding disc surface on each one of such tracks. The dotted lines 26 and 27 on the top surface of the uppermost disc represent two of such tracks which are adjacent to one another.

The apparatus further includes means for sensing movement of the heads relative to the discs and providing output signals from which the position of each head with respect to its corresponding disc surface at any given time can be determined. Most desirably, such system is basically the same as that disclosed in the previously mentioned copending Pat. application Ser. No. 172,781. As described therein, the system relies on a plurality of optical transducers made up of three light sources 28, 29 and 31 and corresponding photoelectric sensors 32, 33 and 34. It further includes means responsive to movement of the heads relative to the discs by varying the amount of light receivable by each of the sensors from its corresponding source. More particularly, a pair of generally light transmitting elements in the form of gratings 36 and 37 are positioned in the light paths (represented by the dotted lines 38) extending from each source to its corresponding sensor. The grating 36 is fixed to the actuator 23 and, hence, with respect to the recording discs, whereas the grating 37 is mounted on the carriage for movement therewith and hence for movement with the read/write heads 16.

Each of the gratings 36 and 37 is provided with a pattern of a opaque character which cooperates with a similar pattern on the other to vary in a predetermined manner the intensity of light permitted to be received by each of the sensors as the gratings move with respect to one another. Since the amount of current generated by each photoelectric sensor will be dependent upon the intensity of the light received thereby, the resulting current output of the sensor will be indicative of the movement of the gratings relative to one another and, hence, movement of the heads relative to their associated disc surfaces.

Most simply, each of the grating assemblies 36 and 37 is made up of a glass plate which is masked with closely spaced parallel lines or stripes to thereby create alternate opaque and transparent areas. As explained in the copending Pat. application Ser. No. 172,781, with such a pattern, movement of grating 37 with respect to grating 36 will provide a shutter effect as the grating lines of the two assemblies alternately become aligned and misaligned with respect to one another. The intensity of the light transmitted through the gratings will be correspondingly increased to a maximum and decreased to a minimum. This will, in turn, cause each sensor to generate an alternately increasing and decreasing signal having a generally triangular waveform indicative of the relative positioning of the two gratings and thus of heads 16 with respect to the discs 12. It is to be noted that the triangular waveform is a spatially dependent waveform rather than a time dependent waveform as one might be originally inclined to conclude.

The grating lines on the assembly 36 are divided into three segments 36A, 36B, and 36C. Although the adjacent lines or stripes of each of these three segments are spaced the same distance apart as the grating lines of the assembly 37, they are in a different spatial relationship with respect to one another. That is, the lines of segments 36B and grid 36C are respectively 180° and 90° spatially out of phase with respect to the lines of segment 36A. The signals generated by the sensors 32, 33, and 34 will be correspondingly out of phase with respect to one another by these relationships.

FIG. 3 illustrates the output signals of each of the transducers, superimposed upon one another. It is the output signals of the sensors 32 and 33 which are used to define the various positions of each of the heads 16 which represent track locations on the disc surfaces. Such signals are respectively represented in FIG. 3 by the dotted line tracings 41 and 42. As mentioned before, the grating lines of segment 36A and 180° spatially out of phase with respect to the lines of segment 36B. Thus, the output signals 41 and 42 are also 180° out of phase as is shown. As brought out in the previously mentioned copending applications, these signals are subtracted so that their points of equal amplitude, two of which are denoted by the reference numerals 43 and 44, represent null points. Such null points are used by the position servo system 24 to represent the successive stopping positions of the heads relative to the disc surfaces, i.e., the location of the tracks on the surfaces.

The output of the sensor 34 is used in the position servo system to indicate the direction of movement of the heads relative to the discs surfaces, as well as to indicate when the heads are within a specified distance of a desired track location so that the positioning mechanism can be appropriately controlled to prevent incorrectible overshoot. Because of the spatial relationship of the lines of grid 36C to the lines of the other two grating segments, such signal, represented by the tracing 46 in FIG. 3, is 90° out of phase with respect to both of the signals 32 and 33. This results in its points of maximum potential value and minimum potential value coinciding in time with the points of equal amplitude of the position signals. It is these points of maxima and minima, represented in the signal tracing respectively by the upper and lower peaks 47 and 48 which must be maintained at a constant level. That is, if the intensity of the light emanating from source 31 varies, such maxima and/or minima will also vary from predetermined set levels and false readings in the decoding of such signal can result in improper dynamic functioning of the positioning mechanism during movement of the heads from one track location on their corresponding disc surfaces, and positioning of such heads at another track location.

In the conventional optical transducer arrangement of the type to which the present invention relates, the potential level of the lower peaks 48 are normally at the same level as the lower peaks of position signals 41 and 42. That is, such peaks are points of zero potential level. This is because the alternate lines and spacings on both of the gratings are dimensioned identically, with the spacings between lines equal to the width of the lines. Thus, whenever the lines of the grating segment 36C are completely out of alignment with the lines of grating 37, no light passes from the source 31 to the sensor 34. It will be appreciated that accurate maintainance of the intensity of the light source 31 at a constant value under such conditions is not possible with feedback from the sensor 34. That is, there is no output signal being generated by the sensor from which a measure of such source intensity can be made. This inability to correct for variations in the light intensity at the points of minimum is especially detrimental when a head is located at a track location represented by one of the minimum points for a period of time during data transfer between such head and the track. It is during the transfer operation that proper amplitude of track vicinity signal is most critical.

As a particularly salient feature of the instant invention, it includes means enabling proper feedback from the photoelectric sensor for automatic gain control of the light source intensity when the track vicinity signal is at or near its minimum values. It accomplishes this by, in effect, biasing the transducer arrangement so that such minimum value is not zero, but rather some positive value which is detectable. Such biasing is preferably obtained by providing transmission for a predetermined amount of light from the source 31 through the grid 36C and grating 37 to the sensor 34 when such gratings are so positioned relative to one another that the grating lines are at their point of maximum misalignment. This is most simply accomplished by providing areas of transparency through the lines of one of the gratings. FIG. 2 illustrates such a preferred arrangement. It depicts portions of grating segment 36C and grating 37 when they are at their points of maximum misalignment, but shows them side by side rather than one on top of another. It can be seen from this figure that when the stripes or lines of the gratings are so misaligned, the stripes 51 of grating 37 fall between the spaces on grid 36C and prevent light transmission therethrough. However, the stripes 52 of grid 36C are not continuous stripes, but rather each is provided with orthogonal transparent areas 53. Thus, when the gratings are so positioned relative to one another that the stripes 52 are at their maximum point of misalignment with respect to the stripes 51, light from the source 31 can still pass through the grating segment 36C and the grating 37 to the sensor 34. Thus, at such time light from source 31 is picked up by sensor 34 and the output of sensor 34 is reflective of the intensity of such light so that with appropriate feedback such intensity can be controlled.

As mentioned previously, in an arrangement as described in application Ser. No. 172,781 in which both the upper and lower potential peaks of the vicinity signal coincide with values of the position signal which denote track locations, it is not sufficient to merely maintain the intensity of the light source constant at one selected state of the track vicinity signal. The light source must be assured of being constant at both states of the signal which coincide in time with track positioning, i.e., both the upper and lower sets of potential peaks, as well as when the heads are moving from one track to another. FIG. 4 diagrammatically illustrates a preferred arrangement for providing this multiple automatic gain control. Grid 36C and grating 37 are respectively represented in the figure, the light source 31 by a light emitting diode connected between a suitable driver 58 and ground, and the sensor 34 by a light responsive photodiode biased by a suitable negative voltage source. The output of sensor 34, which output is proportional to the amount of light received thereby from diode 31, is amplified by an amplifier 61 and fed from the output of such amplifier via output line 62 to the position servo system for decoding.

The automatic gain control circuitry of the invention includes means for comparing the output of amplifier 61 with a reference signal. More particularly, such output is directed via lead 63 to the negative input terminal of an operational amplifier 64. The amplifier 64 is of the inverting type, and the reference signal with which the sensor output is to be compared is applied to the other input terminal of such amplifier. In this connection, a pair of constant level direct current potential sources 66 and 67 are provided for selective connection between ground and such input terminal via a switch 68. The potential sources 66 and 67 have values respectively corresponding to the upper and lower peak values 47 and 48 of the vicinity signal, and the switch 68 enables a selected one of the two sources to be compared with the output of the amplifier 61 dependent upon the particular mode of operation of the apparatus. That is, a control arrangement for switch 68 is provided including a mode detector 69 which is responsive to the position servo system by determining whether at any given time the carriage 21 is moving heads 16 radially across the disc surfaces from one track location to another, i.e., the apparatus is in the seek mode, or the carriage is positioning the heads within the general vicinity of a desired track for the transfer of data between the head and its surface, i.e., the apparatus is in the "on track" mode. If the carriage is moving the heads in the seek mode, the mode detector provides an output signal which causes the switch 68 to connect the potential source 66 representative of the upper peak potential levels to the operational amplifier 64. However, if the mode detector indicates that the heads are in the on-track mode, the mode detector switches discrimination logic 71 into control of the switch. Such logic has two inputs, one as represented by the pulse train 72 indicative of the positioning of a head at a track location represented by an upper peak potential, and one represented by the pulse train 73 indicative of when the head is positioned at a track location represented by one of the lower potential peaks 48 of the vicinity signal. Upon receipt of a pulse indicating head positioning at a track coinciding with an upper peak of the vicinity signal, the logic directs switching of the source of higher potential, source 66, into connection with the operational amplifier, whereas upon receipt of an input pulse indicating that the head is located at a track represented by a peak of lower potential, the logic directs the switch to connect the potential source 67 to the operational amplifier.

In view of the provision of the two reference levels and the switching arrangement as discussed above, the output of the operational amplifier will provide an error signal which is used by a capacitance memory compensation circuit, generally referred to by the reference numeral 74, to correct the output of the driver 58 as is necessary to maintain the light output of diode 57 at the required constant level. In this connection, the compensation circuit 74 includes a capacitance 76 which is connected through a resistance 77 between the output of the amplifier and ground. Such capacitance will therefore tend to be charged to the potential represented by the amplifier output. In this regard, any discharge of the capacitance which becomes necessary to maintain the potential across the capacitor equal to the potential output of the amplifier is effected through a second resistance 78 via return path diode 79 bypassing resistance 77.

The input of the driver 58 is connected to the capacitor 76 so as to have its output potential varied in accordance with the charging and discharging of such capacitor. In this connection, because the amplifier 64 is of the inverting type and the feedback is to its negative terminal, the amplifier output will be inversely proportional to any deviation in the output of the sensor 59 from the potential level of the source with which it is being compared. That is, the output of operational amplifier 64 will be positive when the potential level of the output of amplifier 61 is less than the potential to which it is compared, but such error output will be negative when such potential is more than that to which it is compared. This means that when the apparatus is in the on-track mode, and the output of photodiode 34 indicates that the intensity of the light emitting diode 31 is lower than the desired constant level, the capacitor 76 will be caused to charge by the operational amplifier 64 to thereby cause the driver 58 to drive light emitting diode 31 to a proportionally greater degree. However, whenever the intensity of the light emitting diode 31 exceeds the selected level, the output of the operational amplifier will be correspondingly lowered to thereby lower the driving potential applied by the capacitance to the driver 58.

It will be appreciated that when the apparatus is in the seek mode, i.e., the carriage is moving the heads between one track location to another, the potential of the output of amplifier 61 will vary between the upper and lower peaks in the triangular waveform illustrated in FIG. 3. During this time, though, it is only the upper peak potential level which is to be used in providing the desired correction signal from the compensation circuit. In order to prevent the potential variations in the signal from adversely affecting the compensation, the resistance 77 is so chosen that the charging time constant for the capacitor 76 is relatively long so that the "error" detected by the operational amplifier 64 between the peak potential levels will not cause such capacitor to be charged at such time by an amount greater than, for example, one percent of its steady state value. However, in order to assure that the capacitor can provide the desired potential compensation for the output of the driver 58 when it is necessary, the discharge time of the capacitor must be fast relative to the speed of motion of the heads during the seek mode. To this end, the value of resistance 78 is selected to be a low value providing the desired discharge time.

While the invention has been described in connection with a preferred embodiment thereof, it will be recognized by those skilled in the art that various changes and modifications can be made without departing from its spirit. For example, the lower potential limit of the range over which the track vicinity signal is variable can be used to provide for the desired compensation during the seek condition, rather than the upper potential peak. To effect this modification, it is only necessary to compare the output signal generated by the light emitting diode with the lower potential reference source during the seek and reverse the charging and discharging time constants of the capacitor 76. It is therefore intended that the coverage afforded applicant be limited only by the claims and their equivalents.

We claim:

1. In apparatus for sensing the movement of a movable carriage with respect to a stationary member, a first grating mounted on said movable carriage, a plurality of gratings and a grid, all called a second grating, mounted parallel to said first grating on said stationary member, each grating and grid having parallel alternating transparent and non-transparent lines, a plurality of light sources on one side of said second grating mounted for directing light through said first and said second gratings, sensing means positioned to detect light directed through said first and said second gratings whereby, with movement of said first grating, light will be alternately blocked and transmitted although never allowing said light through said grid to be totally extinguished thereby to permit light to strike the sensor even when the lines are moved to maximum light blocking position.

* * * * *